(12) United States Patent
Katsuyama (10) Patent No.: US 11,209,531 B2
(45) Date of Patent: Dec. 28, 2021

(54) ULTRASONIC DIAGNOSTIC DEVICE AND ULTRASONIC IMAGE GENERATION METHOD (71) Applicant: FUJIFILM Corporation, Tokyo (JP)

(72) Inventor: Kimito Katsuyama, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 464 days.

(21) Appl. No.: 15/055,054

(22) Filed: Feb. 26, 2016

(65) Prior Publication Data
US 2016/0178738 A1 Jun. 23, 2016

Related U.S. Application Data (63) Continuation of application No. PCT/JP2014/062322, filed on May 8, 2014.

(30) Foreign Application Priority Data

Aug. 30, 2013 (JP) .............................. JP2013-180026

(51) Int. Cl.
G01S 7/52 (2006.01)
G01S 15/89 (2006.01)

(52) U.S. Cl.
CPC ...... *G01S 7/52049* (2013.01); *G01S 15/8915* (2013.01)

(58) Field of Classification Search
None
See application file for complete search history.

(56) References Cited

U.S. PATENT DOCUMENTS 5,388,461 A * 2/1995 Rigby ................. G01S 7/52023
600/442
2005/0203412 A1 9/2005 Amemiya
(Continued)

FOREIGN PATENT DOCUMENTS

JE 6-327670 A 11/1994
JP 9-224938 A 9/1997
(Continued)

OTHER PUBLICATIONS

International Search Report for PCT/JP2014/062322 dated Jun. 3, 2014.
(Continued)

Primary Examiner — Hovhannes Baghdasaryan
(74) Attorney, Agent, or Firm — Birch, Stewart, Kolasch & Birch, LLP (57) ABSTRACT There are provided an ultrasonic diagnostic device and an ultrasonic image generation method in which the direction of a beam formed in a subject is not changed even if at least one of set sound speeds used in transmission focusing processing and reception focusing processing is changed. When at least one of the set sound speeds used in the transmission focusing processing and the reception focusing processing has been changed by a set sound speed changing unit, a focusing processing correction unit corrects a delay of at least one of the transmission focusing processing and the reception focusing processing based on the changed set sound speed such that the direction of the beam formed in the subject is not changed.

13 Claims, 8 Drawing Sheets (56) References Cited

U.S. PATENT DOCUMENTS

| | | | |
|---|---|---|---|
| 2007/0083110 A1* | 4/2007 | Lin ......................... | A61B 8/08 |
| | | | 600/437 |
| 2012/0232396 A1 | 9/2012 | Tanabe | |
| 2012/0281902 A1* | 11/2012 | Oikawa ............... | G01S 7/52034 |
| | | | 382/131 |
| 2014/0180090 A1* | 6/2014 | Ohta ..................... | A61B 8/485 |
| | | | 600/438 |

FOREIGN PATENT DOCUMENTS

| | | |
|---|---|---|
| JP | 2005-253699 A | 9/2005 |
| JP | 2012-157387 A | 8/2012 |
| JP | 2012-200514 A | 10/2012 |

OTHER PUBLICATIONS

International Preliminary Report on Patentability dated Mar. 10, 2016, issued in PCT/JP2014/062322 (Forms PCT/IB/338, PCT/IB/373 and PCT/ISA/237).
Japanese Notification of Reasons for Refusal for Japanese Application No. 2013-180026, dated Aug. 23, 2016, including an English Machine translation.
Chinese Office Action dated Jul. 25, 2017, issued in corresponding Chinese Patent Application No. 201480047269.3, with English translation.

* cited by examiner

ULTRASONIC DIAGNOSTIC DEVICE AND ULTRASONIC IMAGE GENERATION METHOD

CROSS REFERENCE TO RELATED APPLICATIONS

This application is a continuation application of International Application PCT/JP2014/062322 filed on May 8, 2014, which claims priority under 35 U.S.C. 119(a) to Application No. 2013-180026 filed in Japan on Aug. 30, 2013. The above application is hereby expressly incorporated by reference, in its entirety, into the present application.

BACKGROUND OF THE INVENTION

1. Field of the Invention

The present invention relates to an ultrasonic diagnostic device and an ultrasonic image generation method, and in particular, to an ultrasonic diagnostic device that captures an ultrasonic image by steering at least one of the transmission beam and the reception beam.

2. Description of the Related Art

Conventionally, in the medical field, an ultrasonic diagnostic device using an ultrasonic image has been put into practical use. The ultrasonic diagnostic device generates an ultrasonic image based on a reception signal by transmitting an ultrasonic wave toward a subject from an ultrasonic probe and receiving the ultrasonic echo from the subject with the ultrasonic probe.

In the generation of an ultrasonic image, when performing a sector scan in order to observe a wide range, when performing spatial compounding for speckle reduction or the like, and when visualization is difficult if a beam is not vertically incident on an object showing specular reflection, such as a needle, transmission or reception focusing may be performed by steering. Measures have been proposed for various problems occurring when generating an ultrasonic image by performing transmission or reception focusing by steering.

For example, for a problem in which an error occurs due to a delay error caused by the temperature change around the delay circuit when steering the ultrasonic beam by applying a predetermined delay time to each transducer of the ultrasonic probe, JP1994-327670A (JP-H06-327670A) discloses controlling the steering angle accurately by correcting the delay time based on the signal of the temperature sensor provided in the device. In addition, JP2005-253699A discloses asymmetrically applying a weight (transmission output or reception gain), which is applied to each transducer in order to suppress side lobes when steering the ultrasonic beam, so as to offset the asymmetry of the attenuation values for the symmetry axis of the transducer arrangement in the opening, so that a desired ultrasonic beam can be formed by making the weight of each transducer viewed from the focus symmetrical.

SUMMARY OF THE INVENTION

Figure 5:
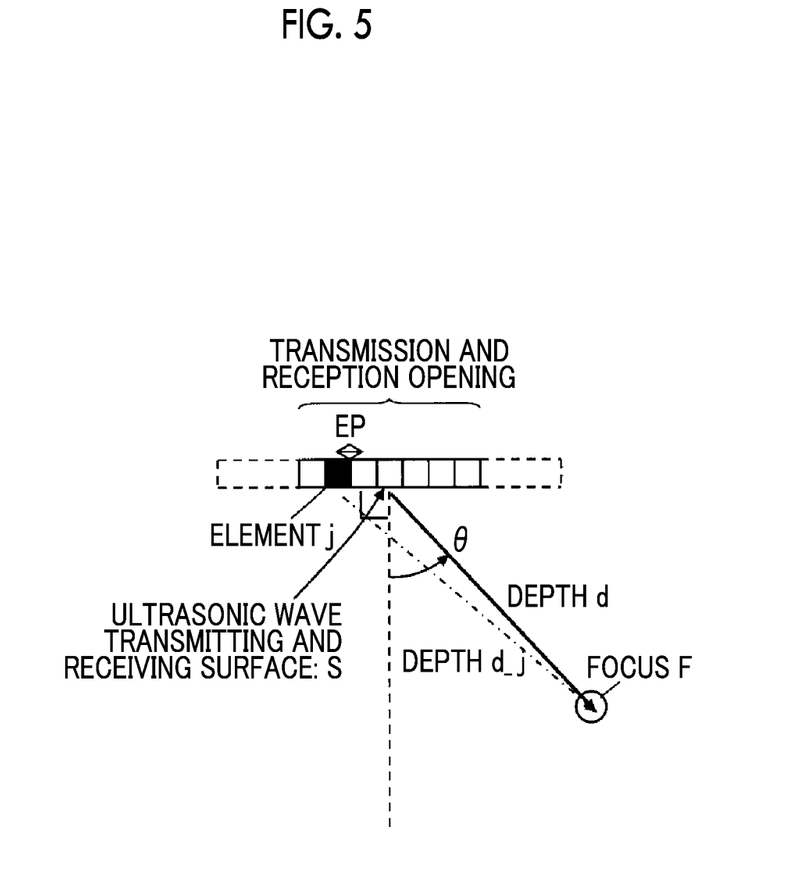
FIG. 5 is an explanatory diagram for explaining the distance from each element of the transmission and reception opening to a predetermined focus in the subject.
Figure 11:
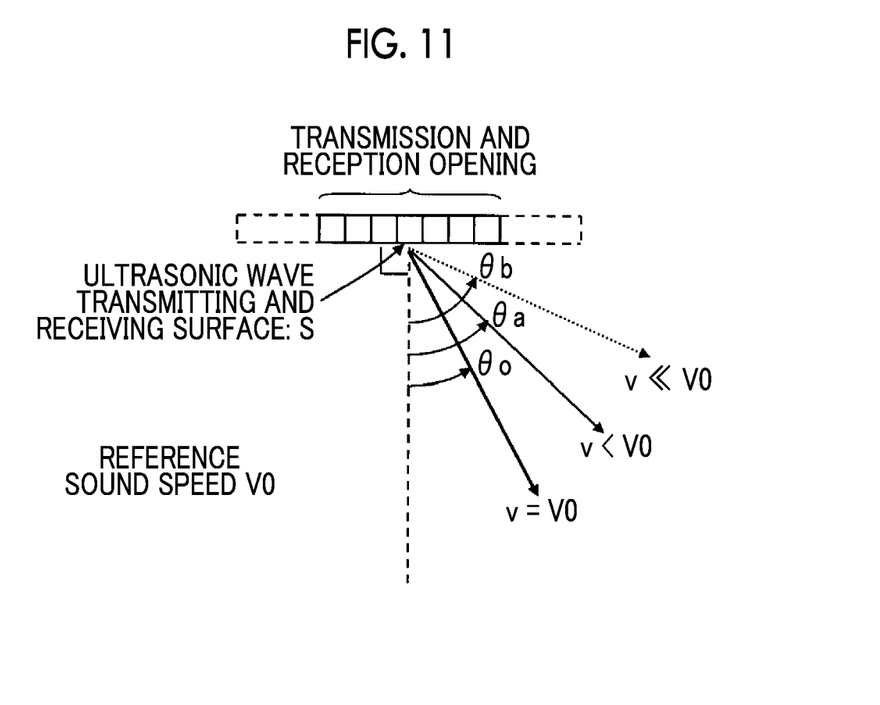
FIG. 11 is an explanatory diagram for explaining the relationship between the set sound speed, the sound speed value of the subject, and the steering direction that are used in transmission focusing processing or reception focusing processing.

In order to steer the transmission or reception focus, the sound speed of the subject is assumed and a predetermined delay time is given to each transducer. Specifically, as shown in FIG. 5, in order to perform transmission or reception focusing on a focus F that is located at a depth d in a direction of angle $\theta$ from the center of the transmission and reception opening, the delay time of each transducer is calculated and given by calculating a distance between each transducer and the focus F using Equation (22) and dividing the distance by a set sound speed v. However, when performing transmission or reception focusing in this manner, if the set sound speed v is different from the sound speed of the subject, the direction of the transmission beam or the reception beam is shifted from a steering direction $\theta$. For example, in order to perform transmission or reception focusing, in a direction of angle $\theta 0$ as shown in FIG. 11, when calculating the delay time of each transducer at the set sound speed v and performing transmission or reception focusing based on the calculated delay time, if the set sound speed v is the same as the sound speed V0 of the subject, the direction of the transmission beam or the reception beam matches the desired steering, direction $\theta 0$. However, when the set sound speed value v is smaller than the sound speed V0 of the subject, the direction of the transmission beam or the reception beam becomes a $\theta a$ direction. In addition, when the set sound speed value v is much smaller than the sound speed V0 of the subject, the direction of the transmission beam or the reception beam becomes a $\theta b$ direction.

Thus, since the direction of the transmission beam or the reception beam that is actually formed in the subject changes depending on the set sound speed v, various problems occur. Specifically, when the set sound speed of transmission focusing is different from the set sound speed of reception focusing, the beam directions are shifted from each other. Accordingly, a problem occurs in which the image quality is degraded. In addition, when the set sound speed of transmission focusing or reception focusing is changed, the position on the image in the subject is changed. Accordingly, a problem occurs in which ultrasonic images with different set sound speeds cannot be accurately compared with each other. Measures against such problems have not yet been proposed.

It is an object of the present invention to provide an ultrasonic diagnostic device and an ultrasonic image generation method in which a steering direction (direction of a beam that is actually formed in the subject) is not changed even if the set sound speed used in transmission focusing processing or reception focusing processing is changed in the case of performing ultrasonic diagnosis by performing at least one of the transmission focusing processing and the reception focusing processing in a desired steering direction.

In order to solve the aforementioned problem, the present invention provides an ultrasonic diagnostic device that transmits an ultrasonic wave toward a subject from an ultrasonic probe and generates an ultrasonic image based on obtained reception data. The ultrasonic diagnostic device includes: a transmission and reception unit that performs at least one of transmission focusing processing and reception focusing processing in a desired steering direction; a set sound speed changing unit that changes at least one of set sound speeds used in the transmission focusing processing and the reception focusing processing; and a focusing processing correction unit that corrects a delay of at least one of the transmission focusing processing and the reception focusing processing based on the set sound speed when the set sound speed has been changed by the set sound speed changing unit.

It is preferable that the focusing processing correction unit corrects the delay of at least one of the transmission focusing processing and the reception focusing processing based on a correction angle calculated by the following Equation (A).

$$\theta = \arcsin(\sin(\theta 0) \cdot v/V0) \qquad (A)$$

Here, θ: correction angle, θ0: angle of steering direction, v: set sound speed, and V0: reference sound speed set additionally.

It is preferable that the focusing processing correction unit further includes a correction table and corrects the delay of at least one of the transmission focusing processing and the reception focusing processing based on the correction table.

A distance from a predetermined position in the subject to each element of the ultrasonic probe may be described in the correction table.

A distance from a predetermined position in the subject to each element of the ultrasonic probe and an arrival time from the predetermined position, which is calculated from the set sound speed and a reference sound speed set additionally, to each element or a delay that is a difference between the arrival time and an arrival time in a specific element of the ultrasonic probe may be described in the correction table.

It is preferable to further include an image generation unit. Preferably, the image generation unit further includes an image memory that stores a plurality of ultrasonic images as image data and an image processing section that combines a plurality of the ultrasonic images based on the image data stored in the image memory, and the image processing section generates a composite ultrasonic image by combining a plurality of ultrasonic images having the different steering directions.

In addition, the present invention provides an ultrasonic image generation method of transmitting an ultrasonic wave toward a subject from an ultrasonic probe and generating an ultrasonic image based on obtained reception data. The ultrasonic image generation method includes: performing at least one of transmission focusing processing and reception focusing processing in a desired steering direction; changing at least one of set sound speeds used in the transmission focusing processing and the reception focusing processing; and correcting a delay of at least one of the transmission focusing processing and the reception focusing processing based on the set sound speed when the set sound speed has been changed.

According to the present invention, even if at least one of the set sound speeds used in the transmission focusing processing and the reception focusing processing is changed, the steering direction (direction of a beam that is actually formed in the subject) is not changed. Therefore, it is possible to eliminate the image quality degradation due to the shift of the directions of the transmission beam and the reception beam. In addition, since the position on the image in the subject is not changed, it is possible to accurately compare an ultrasonic image before changing the set sound speed with an ultrasonic image after the change.

DESCRIPTION OF THE PREFERRED EMBODIMENTS

Hereinafter, an ultrasonic diagnostic device according to the present invention will be described in detail with reference to the accompanying diagrams.

First Embodiment

Figure 1:
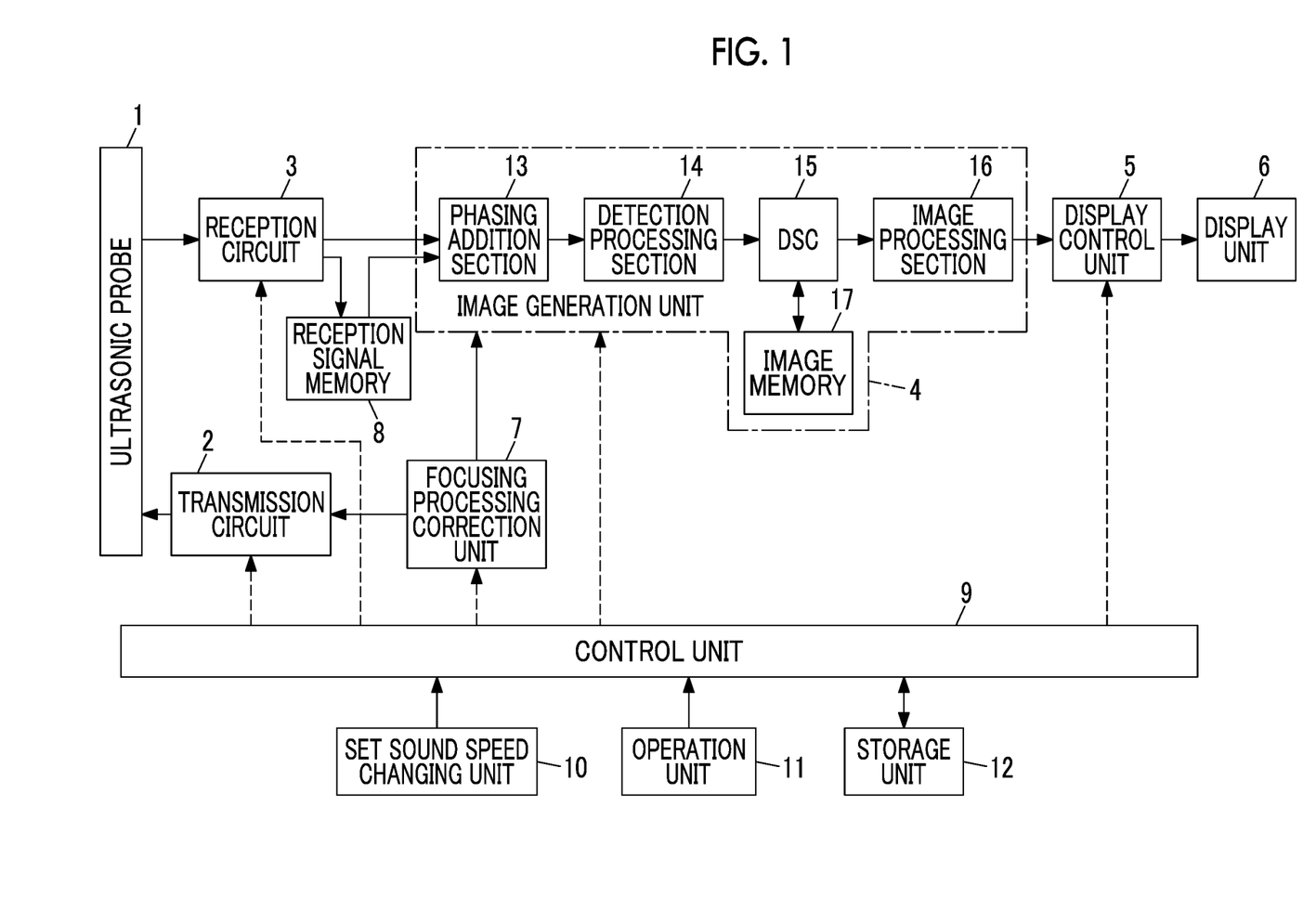
FIG. 1 is a block diagram showing the overall configuration of an ultrasonic diagnostic device according to a first embodiment of the present invention.

FIG. 1 is a block diagram showing the overall configuration of an ultrasonic diagnostic device according to a first embodiment of the present invention. As shown in FIG. 1, the ultrasonic diagnostic device according to the first embodiment includes an ultrasonic probe 1, and a transmission circuit 2 and a reception circuit 3 are connected to the ultrasonic probe 1. An image generation unit 4, a display control unit 5, and a display unit 6 are sequentially connected to the reception circuit 3. A focusing processing correction unit 7 is connected to the transmission circuit 2 and the image generation unit 4, and a reception signal memory 8 is connected to the reception circuit 3.

A control unit 9 is connected to the transmission circuit 2, the reception circuit 3, the image generation unit 4, the display control unit 5, the focusing processing correction unit 7, and the reception signal memory 8, and a set sound speed changing unit 10, an operation unit 11, and a storage unit 12 are connected to the control unit 9.

The image generation unit 4 includes a phasing addition section 13, a detection processing section 14, a digital scan converter (DSC) 15, and an image processing section 16, which are sequentially connected between the reception circuit 3 and the display control unit 5, and an image memory 17 connected to the DSC 15.

The ultrasonic probe 1 includes a plurality of elements arranged in a one-dimensional or two-dimensional array, and transmits an ultrasonic beam (transmission beam) based on a transmission signal supplied from the transmission circuit 2, receives an ultrasonic echo from the subject, and outputs a reception signal. For example, each element that forms the ultrasonic probe 1 is formed by a transducer in which electrodes are formed at both ends of the piezoelectric body formed of piezoelectric ceramic represented by lead zirconate titanate (PZT), a polymer piezoelectric element represented by polyvinylidene fluoride (PVDF), piezoelectric single crystal represented by lead magnesium niobate-lead titanate solid solution (PMN-PT), or the like.

When a pulsed or continuous-wave transmission signal voltage is applied to the electrodes of the transducer, the piezoelectric body expands and contracts to generate pulsed or continuous-wave ultrasonic waves from each transducer. By combination of these ultrasonic waves, a transmission beam is folioed. In addition, the respective transducers expand and contract by receiving the propagating ultrasonic waves, thereby generating electrical signals. These electrical signals are output as ultrasonic reception signals.

The transmission circuit 2 includes a plurality of pulsers, for example. The transmission circuit 2 performs transmission focusing processing by adjusting the amount of delay of each transmission signal so that ultrasonic waves transmitted from the plurality of elements of the ultrasonic probe 1 form the above-described transmission beam based on the transmission delay pattern output from the control unit 9 and supplying the adjusted signals to the plurality of elements. In the transmission circuit 2, it is possible to form a transmission beam in a desired steering direction by adjusting the amount of delay of each transmission signal.

The reception circuit 3 performs amplification and A/D conversion of the analog reception signals output from the plurality of elements of the ultrasonic probe 1, and outputs digital reception signals to the phasing addition section 13 of the image generation unit 4 in response to the instruction from the control unit 9, and outputs digital reception signals to the reception signal memory 8 in response to the instruction from the control unit 9.

The phasing addition section 13 of the image generation unit 4 acquires the digital reception signals from the reception circuit 3 in response to the instruction from the control unit 9, and performs reception focusing processing by delaying the reception signals based on the reception delay pattern from the control unit 9 and adding the delayed reception signals. In the phasing addition section 13, a reception beam is formed in a desired steering direction by delaying each reception signal, and reception data (sound ray signal) is generated based on the reception beam. In addition, the phasing addition section 13 may acquire the reception signal stored in the reception signal memory 8, and generate reception data in the same manner as described above.

The detection processing section 14 generates a B-mode image signal, which is tomographic image information regarding a tissue within the subject, by correcting the attenuation due to the distance according to the depth of the reflection position of the ultrasonic wave and then performing envelope detection processing for the reception data.

The DSC 15 converts the B-mode image signal generated by the detection processing section 14 into an image signal according to the normal television signal scanning method (raster conversion). In addition, by converting the B-mode image signal in the DSC 15, it is possible to grasp the distance or the direction corresponding to the subject on the B-mode image.

The image processing section 16 generates a B-mode image signal for display by performing various kinds of required image processing, such as gradation processing, on the B-mode image signal input from the DSC 15.

The image memory 17 stores the B-mode image signal corresponding to the reception data before being converted by the DSC 15.

The display control unit 5 acquires the B-mode image signal for display from the image processing section 16 of the image generation unit 4 in response to the instruction from the control unit 9, and outputs a B-mode image signal for display to the display unit 6 in response to the instruction from the control unit 9.

The display unit 6 acquires the B-mode image signal for display from the display control unit 5, and displays a B-mode image for display in response to the instruction from the display control unit 5.

When the set sound speed used in transmission focusing processing has been changed, the focusing processing correction unit 7 corrects the transmission delay pattern used in transmission focusing processing based on the changed set sound speed so that the desired steering direction and the steering direction of the transmission beam are not shifted from each other, and outputs the corrected transmission delay pattern to the transmission circuit 2. Similarly, when the set sound speed used in reception focusing processing has been changed, the focusing processing correction unit 7 corrects the reception delay pattern used in reception focusing processing so that the desired steering direction and the steering direction of the reception beam are not shifted from each other, and outputs the corrected reception delay pattern to the image generation unit 4.

The reception signal memory 8 stores the digital reception signal output from the reception circuit 3 in response to the instruction from the control unit 9.

The control unit 9 controls each unit as described above based on the instruction input from the operation unit 11 by the operator. The control unit 9 calculates a transmission delay pattern, which is to be used in transmission focusing processing in the transmission circuit 2, from the set sound speed set in advance and outputs the transmission delay pattern to the transmission circuit 2, and calculates a reception delay pattern, which is to be used in reception focusing processing in the phasing addition section 13, and outputs the reception delay pattern to the phasing addition section 13. When the above set sound speed has been changed by the set sound speed changing unit 10, the control unit 9 outputs the changed set sound speed to the focusing processing correction unit 7.

The set sound speed changing unit 10 changes the set sound speed, which is set in advance, in response to the instruction of the user. The set sound speed changing unit 10 may change only the set sound speed used in transmission focusing processing, and may change only the set sound speed used in reception focusing processing, and may change both the set sound speed used in transmission focusing processing and the set sound speed used in reception focusing processing.

The operation unit 11 is used when the user performs an input operation, and is formed by a keyboard, a mouse, a trackball, a touch panel, and the like.

Various kinds of information input from the operation unit 11, information based on the above-described transmission delay pattern or reception delay pattern, information regarding the reference sound speed that is the value of the speed of sound in the subject, set sound speed that is a sound speed value used in transmission focusing processing, reception focusing processing, and attenuation correction processing, and the transmission opening and the reception opening of the ultrasonic probe 1, an operation program required for the control of each unit, and the like are stored in the storage unit 12. Recording media, such as a hard disk, a flexible disk, an MO, an MT, a RAM, a ROM, a CD-ROM, and a DVD-ROM, can be used.

Next, in the ultrasonic diagnostic device according to the first embodiment of the present invention, an operation when generating an ultrasonic image by performing a sector scan will be described.

Figure 2:
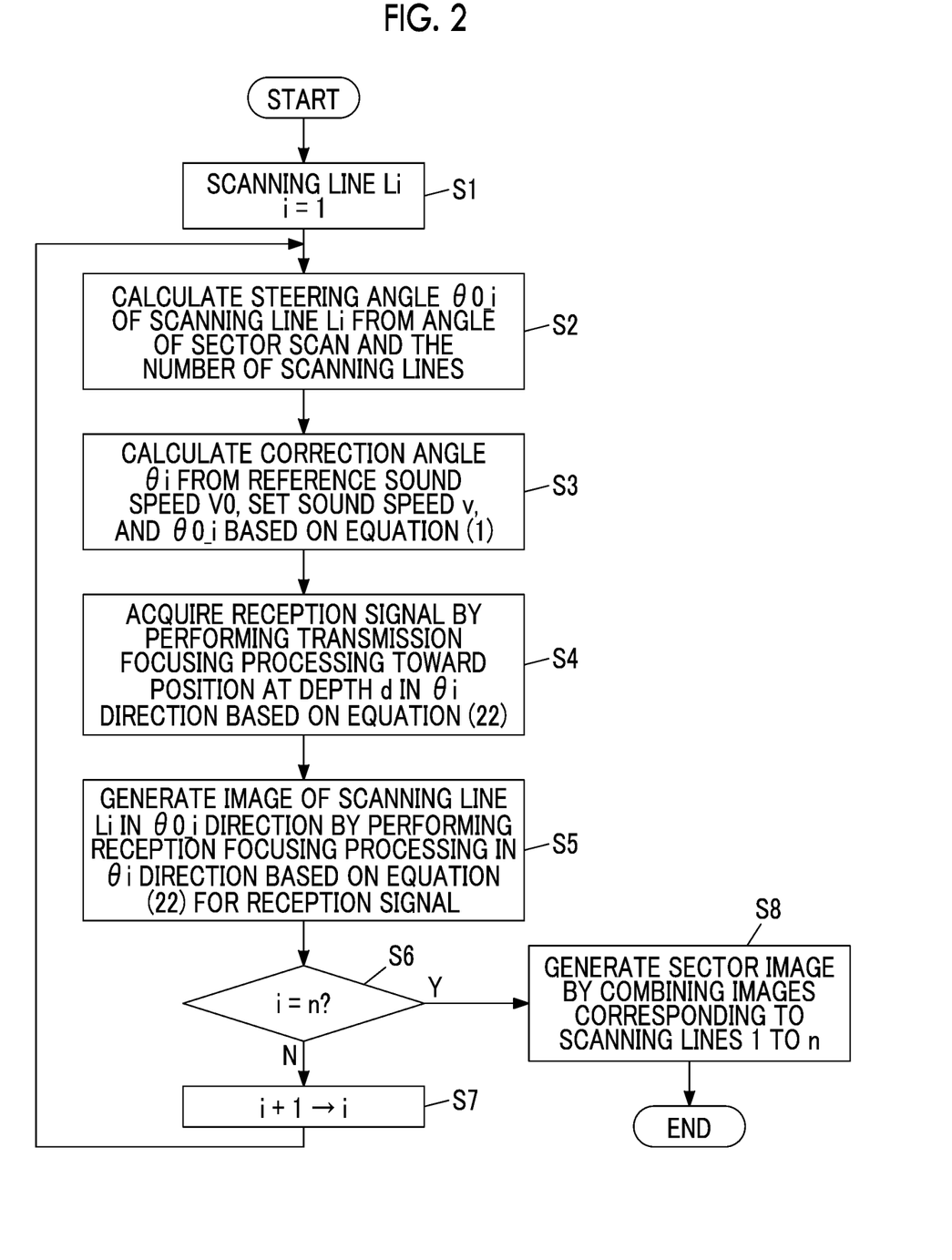
FIG. 2 is a flowchart showing an operation of generating an ultrasonic image by performing a sector scan in the ultrasonic diagnostic device shown in FIG. 1.

FIG. 2 is a flowchart showing the operation described above.

Figure 3:
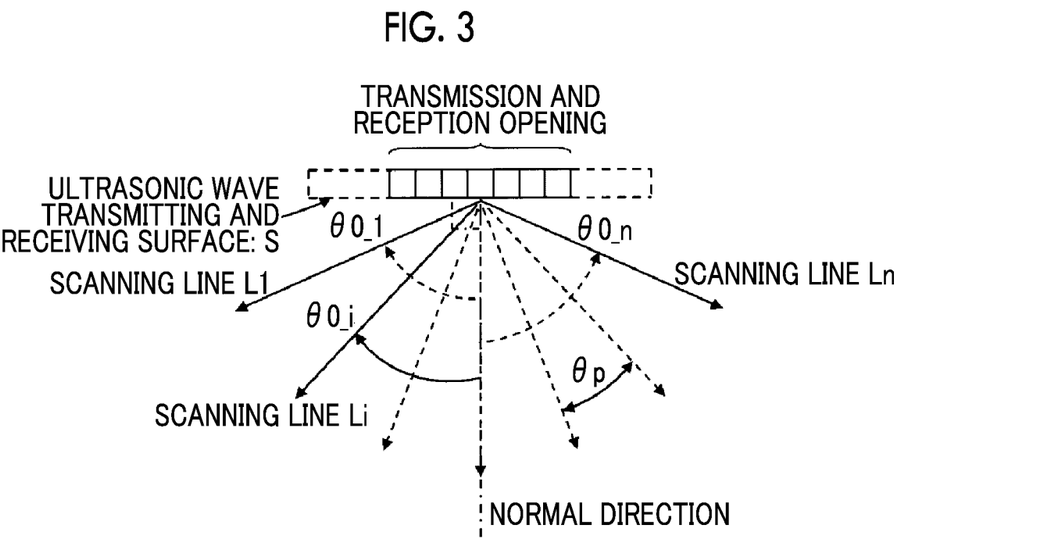
FIG. 3 is an explanatory diagram for explaining a scanning line and the steering angle of the scanning line in a sector scan.

First, in step S1, i=1 is set in a scanning line Li (i=1 to n) in a predetermined direction that is steered by a predetermined angle $\theta 0\_i$ from the normal direction of an ultrasonic wave transmitting and receiving surface S of the ultrasonic probe 1 shown in FIG. 3. Here, i is the order of the scanning line of the ultrasonic probe 1 when performing a sector scan, and the ultrasonic probe 1 transmits a transmission beam corresponding to each scanning line, and acquires a reception signal corresponding to each scanning line.

Then, in step S2, a steering angle $\theta 0\_1$ of the above-described scanning line L1 is calculated. For example, the steering angle $\theta 0\_1$ is calculated from the swing width of the scanning line Li in a sector scan. After the steering angle $\theta 0\_1$ of the scanning line L1 and the steering angle $\theta 0\_n$ of the scanning line Ln are calculated, an angle $\theta p$ between the adjacent scanning lines can be calculated by dividing the angles of the scanning line L1 to the scanning line Ln by the number n−1 of scanning lines Li. Based on the angle $\theta p$ between the adjacent scanning lines, it is possible to calculate the steering angle $\theta 0\_i$ of the general scanning line Li.

After the steering angle $\theta 0\_1$ of the scanning line L1 is calculated, in step S3, a correction steering angle $\theta 1$ is calculated based on a reference sound speed V0 that is the value of the speed of sound in the subject, a set sound speed v in transmission focusing processing and reception focusing processing, and the steering angle $\theta 0\_1$ of the predetermined scanning line L1. The correction steering angle $\theta 1$ is given by the following Equation (1).

$$\theta i = \arcsin(\sin(\theta 0\_i) \cdot v/V0) \tag{1}$$

Figure 4:
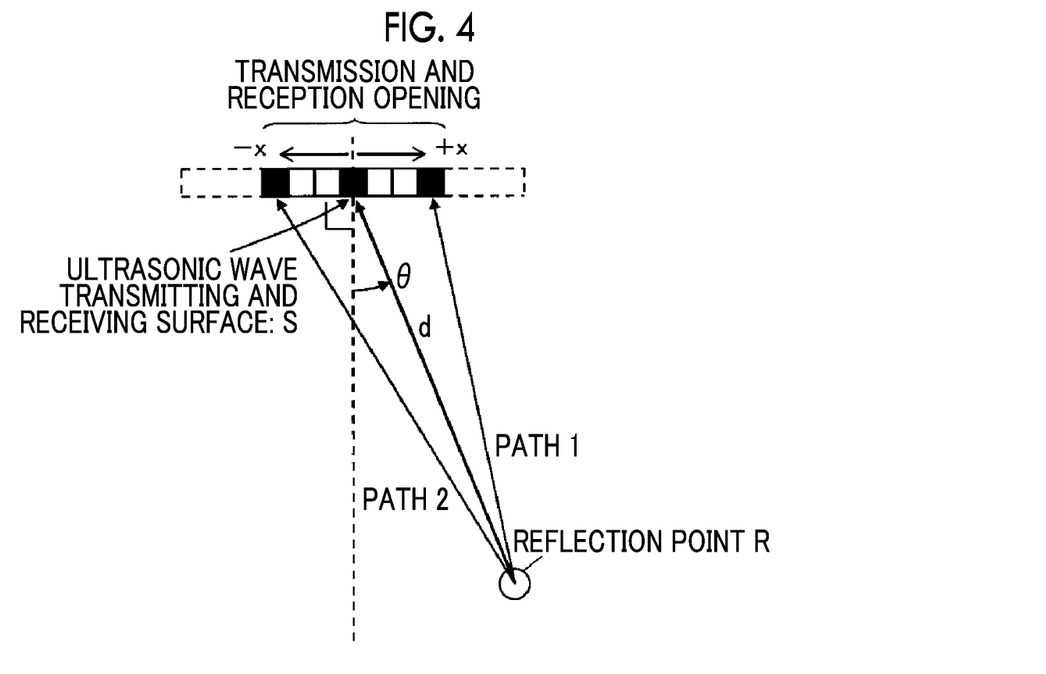
FIG. 4 is an explanatory diagram for explaining the relationship of the distance between a predetermined reflection point in a subject and a transmission and reception opening of an ultrasonic probe.

The above Equation (1) is derived based on FIG. 4.

As shown in FIG. 4, the sound speed in the subject is set to v, and a reflection point R that is located at a depth d in a direction of predetermined angle $\theta$ with respect to the normal direction of the ultrasonic wave transmitting and receiving surface S from the center of the transmission and reception opening of the ultrasonic probe 1 is considered. The ultrasonic echo from the reflection point R reaches each of an element at the center of the transmission and reception opening, an element at the right end of the transmission and reception opening, and an element at the left end of the transmission and reception opening. Here, times taken for the ultrasonic echo to reach the element at the center, the element at the right end, and the element at the left end are expressed by the following Expressions (2) to (4).

$$\text{Element at the center: } d/v \tag{2}$$

$$\text{Element at the right end(path1): } \sqrt{d^2+x^2-2 \cdot x \cdot d \cdot \sin(\theta)}/v \tag{3}$$

$$\text{Element at the left end(path2): } \sqrt{d^2+x^2+2 \cdot x \cdot d \cdot \sin(\theta)}/v \tag{4}$$

Here, x indicates a distance from the element at the center of the transmission and reception opening to each of the element at the right end and the element at the left end.

From the above Expressions (2) to (4), the delay of arrival time in the element at the right end of the transmission and reception opening with respect to the element at the center of the transmission and reception opening and the delay of arrival time in the element at the left end of the transmission and reception opening with respect to the element at the center of the transmission and reception opening are expressed by the following Expressions (5) and (6).

$$\text{Element at the right end(path1):} (\sqrt{d^2+x^2-2 \cdot x \cdot d \cdot \sin(\theta)})-d)/v \tag{5}$$

$$\text{Element at the left end(path2):} (\sqrt{d^2+x^2+2 \cdot x \cdot d \cdot \sin(\theta)})-d)/v \tag{6}$$

Assuming that the delay of the path 1 expressed by Expression (5) is y1, the delay of the path 2 expressed by Expression (6) is y2, and the distance x from the element at the center of the transmission and reception opening to the element at the right end and the element at the left end is a fixed value, y1 and y2 are expressed as expressions of three variables of v, d, and $\theta$.

Here, assuming that small changes in v, d, and $\theta$ are dv, dd, and d$\theta$, the amounts of change in y1 and y2 when v, d, and $\theta$ are minutely changed are expressed by the following Equations (7) and (8) using a partial differential symbol $\partial$.

$$dy1=(\partial y1/\partial v) \cdot dv+(\partial y1/\partial d) \cdot dd+(\partial y1/\partial \theta) \cdot d\theta \tag{7}$$

$$dy2=(\partial y2/\partial v) \cdot dv+(\partial y2/\partial d) \cdot dd+(\partial y2/\partial \theta) \cdot d\theta \tag{8}$$

Then, from the above Equations (7) and (8), conditions in which the delays y1 and y2 are not changed even if the sound speed v in the subject is changed by dv, that is, the relationship between the sound speed v and a predetermined angle $\theta$ for dy1=dy2=0, is derived. By removing dd from the above Equations (7) and (8), the following Equation (9) is derived.

$$((\partial y2/\partial d) \cdot (\partial y1/\partial v)-(\partial y1/\partial d) \cdot (\partial y2/\partial v)) \cdot dv=-((\partial y2/\partial d) \cdot (\partial y1/\partial \theta)-(\partial y1/\partial d) \cdot (\partial y2/\partial \theta)) \cdot d\theta \tag{9}$$

By calculating each partial differential from Expressions (5) and (6), the following Equations (10) to (15) are obtained.

$$\partial y1/\partial v=-(\sqrt{d^2+x^2-2 \cdot x \cdot d \cdot \sin(\theta)})-d)/v^2 \tag{10}$$

$$\partial y2/\partial v=-(\sqrt{d^2+x^2+2 \cdot x \cdot d \cdot \sin(\theta)})-d)/v^2 \tag{11}$$

$$\partial y1/\partial \theta=-x \cdot d \cdot \cos(\theta)/\sqrt{d^2+x^2-2 \cdot x \cdot d \cdot \sin(\theta)})/v \tag{12}$$

$$\partial y2/\partial \theta=x \cdot d \cdot \cos(\theta)/\sqrt{d^2+x^2+2 \cdot x \cdot d \cdot \sin(\theta)})/v \tag{13}$$

$$\partial y1/\partial d=((d-x \cdot \sin(\theta))/\sqrt{d^2+x^2-2 \cdot x \cdot d \cdot \sin(\theta)})-1)/v \tag{14}$$

$$\partial y2/\partial d=((d+x \cdot \sin(\theta))/\sqrt{d^2+x^2+2 \cdot x \cdot d \cdot \sin(\theta)})-1)/v \tag{15}$$

By substituting the above Equations (10) to (15) into the above Equation (9), Equations (16) and (17) are obtained by approximation since $d^2 >> x^2 \pm 2 \cdot x \cdot d \cdot \sin(\theta)$.

$$\sqrt{d^2+x^2-2 \cdot x \cdot d \cdot \sin(\theta)} \cong d+x^2/d/2-x \cdot \sin(\theta) \tag{16}$$

$$\sqrt{d^2+x^2+2 \cdot x \cdot d \cdot \sin(\theta)} \cong d+x^2/d/2+x \cdot \sin(\theta) \tag{17}$$

Then, the following Equation (18) is obtained.

$$(1/v) \cdot dv=(1/\tan(\theta)) \cdot d\theta \tag{18}$$

In addition, by integrating the above Equation (18), the following Equation (19) is obtained.

$$\log(\sin(\theta)/v)=C(\text{constant}) \tag{19}$$

Here, assuming that the reference sound speed that is the value of the speed of sound in the subject is V0 and the predetermined angle $\theta=\theta 0$ in Expression (19), description as the following Equation (20) is possible.

$$C=\log(\sin(\theta 0)/V0) \tag{20}$$

Therefore, the relationship of the following Equation (21) can be derived from Equations (19) and (20).

$$\sin(\theta)/v = \sin(\theta 0)/V0 \qquad (21)$$

By solving Equation (21) for θ, the above Equation (1) is obtained as follows.

$$\theta = \arcsin(\sin(\theta 0)v/V0) \qquad (1')$$

From (1'), it can be seen that the above θ is uniquely determined by V0, θ0, and v regardless of the focal depth d or the size x of an opening.

In step S4, as shown in FIG. 5, a transmission beam is transmitted by performing transmission focusing processing toward a focus F that is located at a depth d in a direction of angle θ1 (displayed as θ in FIG. 5) from the center of the transmission and reception opening.

Here, assuming that j indicates a j-th element from the center of the transmission and reception opening and the distance between adjacent elements is EP, a distance d_j from the j-th element to the focus F is expressed as the following Equation (22).

$$d\_j = sqrt(d \cdot \cos(\theta))^2 + (d \cdot \sin(\theta) - EP \cdot j)^2) \qquad (22)$$
$$= sqrt(d^2 + (EP \cdot j)^2 - 2 \cdot EP \cdot j \cdot d \cdot \sin(\theta))$$

By calculating the distance d_j between each element j and the focus F from the above Equation (22) and dividing the distance d_j by the set sound speed v, an arrival time from each element j to the focus F is calculated. Then, by taking a difference between the arrival time from each element j to the focus F and the arrival time in the center element of the transmission and reception opening, the delay time of each element j is calculated, and a transmission delay pattern used in the transmission focusing processing is calculated.

Transmission focusing processing is performed based on the calculated transmission delay pattern to transmit a transmission beam to the above focal position, and the ultrasonic echo from the subject is received to acquire the reception signal from the ultrasonic probe 1.

In step S5, the phasing addition section 13 of the image generation unit 4 calculates a reception delay pattern for the reception signal acquired by the reception circuit 3 by calculating the reception delay time of each element corresponding to the scanning line L1 from Equation (22) (at the time of reception focusing, the round-trip arrival time from the center element of the transmission and reception opening to each reception focus is also added) in the same manner as in the case of the transmission focusing described above, and performs reception focusing processing. By performing the reception focusing processing in the phasing addition section 13, reception data corresponding to the scanning line L1 in the θ0_1 direction is generated, a B-mode image signal corresponding to the scanning line L1 in the θ0_1 direction is generated, and the B-mode image signal is stored in the image memory 17.

After the B-mode image signal corresponding to the scanning line L1 in the θ0_1 direction is stored in the image memory 17 as described above, it is determined whether or not i=n in step S6. Since i=1, the process proceeds to step S7 to set i=2 by increasing i by 1, and steps S2 to S6 are repeated again.

By repeating steps S2 to S6 until i=n in this manner, B-mode image signals for all scanning lines corresponding to the sector scan are generated, and are stored in the image memory 17.

When i=n, that is, when the B-mode image signals corresponding to all scanning lines are generated by the sector scan, the process proceeds to step S8. In step S8, the DSC 15 generates one sector image corresponding to the real space by scan-converting the B-mode image signals corresponding to the scanning lines 1 to n stored in the image memory 17. Here, it is assumed that the steering angle and the sound speed used at the time of scan conversion are not the correction steering angles θ1 to θn and the set sound speed v but the steering angles θ0_1 to θ0_n and the reference sound speed V0 or steering angles and a sound speed that are set additionally. The generated sector image is subjected to predetermined gradation processing or the like by the image processing section 16, and is displayed on the display unit 6 through the display control unit 5.

In the ultrasonic diagnostic device according to the first embodiment, in the sector image generated as described above, the position on the image is not changed even if the set sound speed used in the transmission focusing processing and the reception focusing processing is changed. Therefore, it is possible to perform accurate comparative observation between a plurality of images with different set sound speeds.

Second Embodiment

As an ultrasonic image generation method according to a second embodiment of the present invention, using the ultrasonic diagnostic device according to the first embodiment, it is possible to generate a composite image by generating a plurality of ultrasonic images by performing at least one of transmission focusing processing and reception focusing processing in different directions and combining these.

Figure 6:
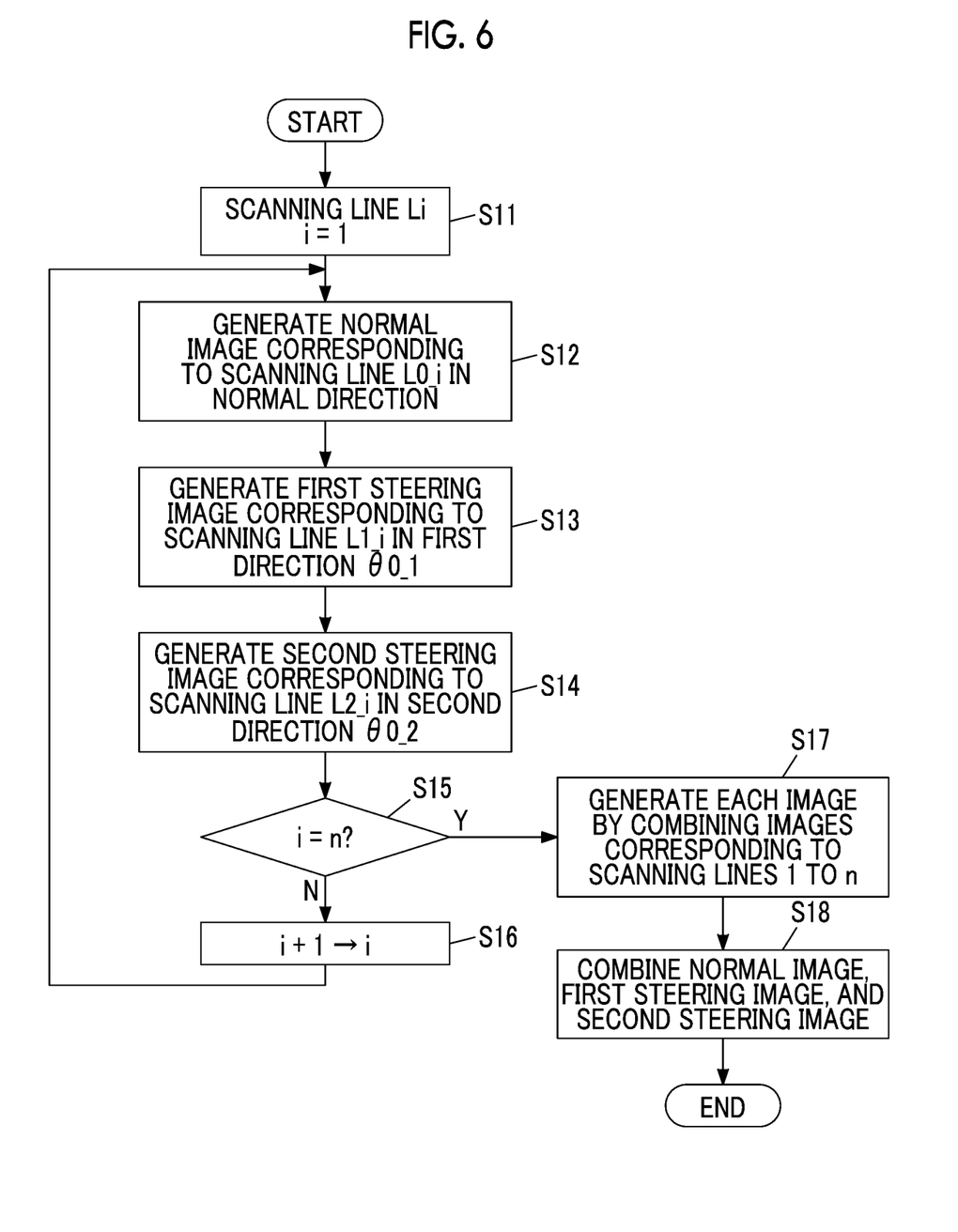
FIG. 6 is a flowchart showing an operation when generating a composite ultrasonic image by combining a plurality of ultrasonic images with different steering directions as an ultrasonic image generation method according to a second embodiment of the present invention.

FIG. 6 is a flowchart showing an operation when generating a composite image by generating three ultrasonic images by performing transmission focusing processing and reception focusing processing in each of three directions of a normal direction, a first direction, and a second direction and combining these.

Figure 7A:
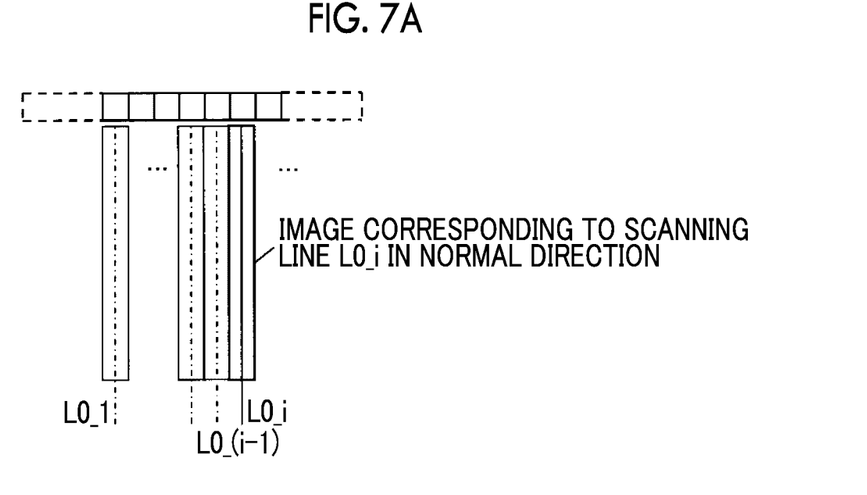
FIG. 7A is an explanatory diagram when generating an ultrasonic image in a normal direction.
Figure 7B:
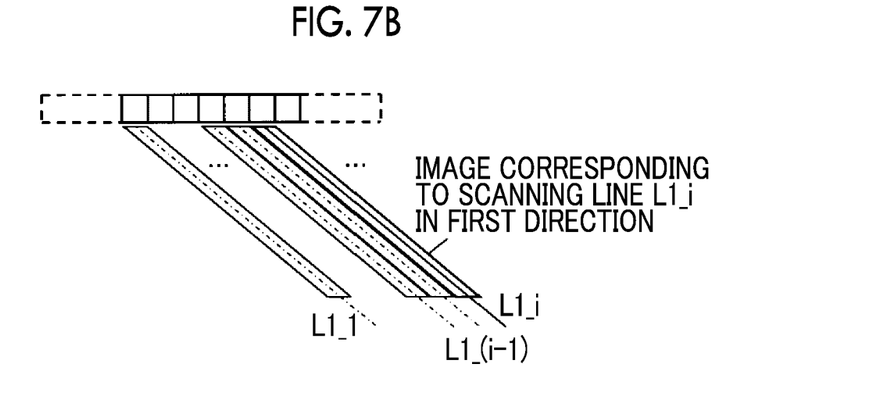
FIG. 7B is an explanatory diagram when generating an ultrasonic image in a first steering direction.
Figure 7C:
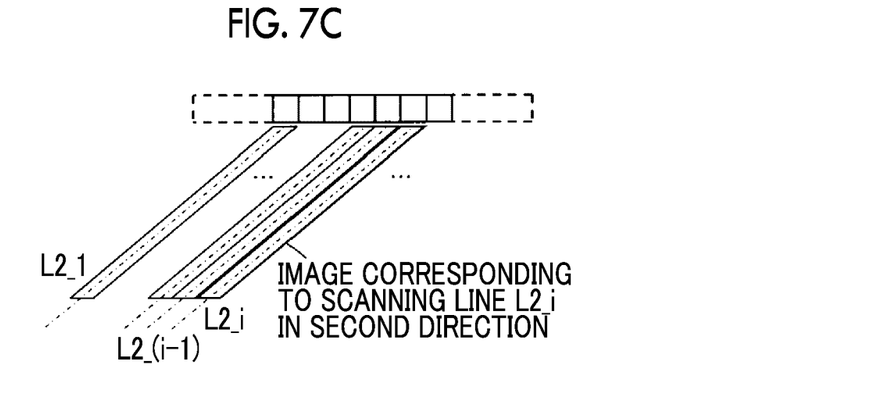
FIG. 7C is an explanatory diagram when generating an ultrasonic image in a second steering direction.

First, in step S11, i=1 is set in scanning lines L0_i, L1_i, and L2_i (i=1 to n) corresponding to predetermined positions of the ultrasonic probe 1 shown in FIGS. 7A to 7C. Here, i is the order of the scanning line of the ultrasonic probe 1 when performing transmission focusing processing and reception focusing processing in the three directions, and the ultrasonic probe 1 acquires a reception signal corresponding to each scanning line.

Then, in step S12, a B-mode image signal of a normal image corresponding to the scanning line L0_1 in the normal direction shown in FIG. 7A is generated.

Figure 8:
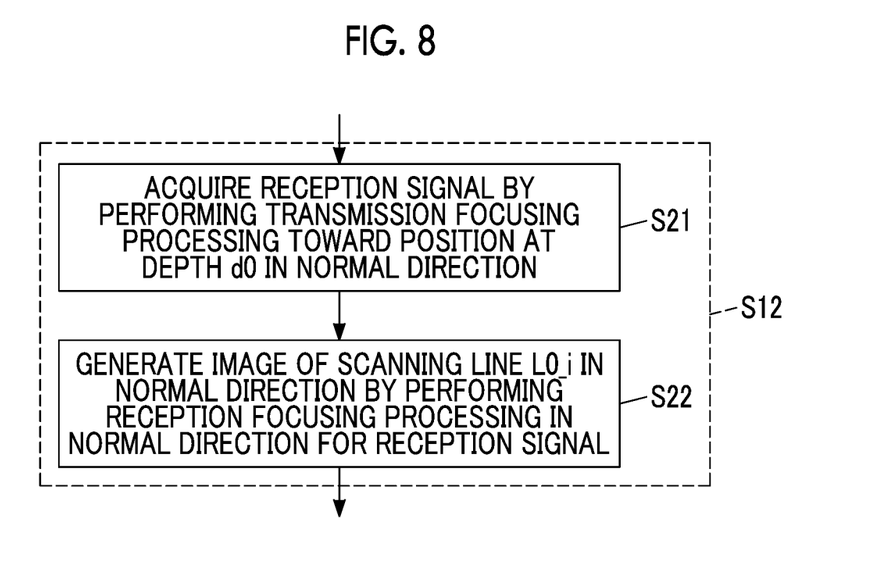
FIG. 8 is a partial flowchart showing the detailed flow of step S12 in FIG. 6.

Specifically, as shown in step S21 of FIG. 8, a transmission beam is transmitted from the ultrasonic probe 1 by performing transmission focusing processing toward a predetermined position in the normal direction, and the ultrasonic echo from the subject is received to acquire the reception signal. Then, as shown in step S22, the phasing addition section 13 of the image generation unit 4 acquires reception data of the scanning line L0_1 in the normal direction by performing reception focusing processing in the normal direction. The reception data of the scanning line L0_1 in the normal direction is subjected to envelope detection processing by the detection processing section 14, and is stored in the image memory 17 as a B-mode image signal of the scanning line L0_1 in the normal direction.

After the B-mode image signal of the scanning line L0_1 in the normal direction is stored in the image memory 17, the process proceeds to step S13 to generate a B-mode image signal of a first steering image corresponding to the scanning line L1_1 in the first direction θ0_1 shown in FIG. 7B.

Figure 9:
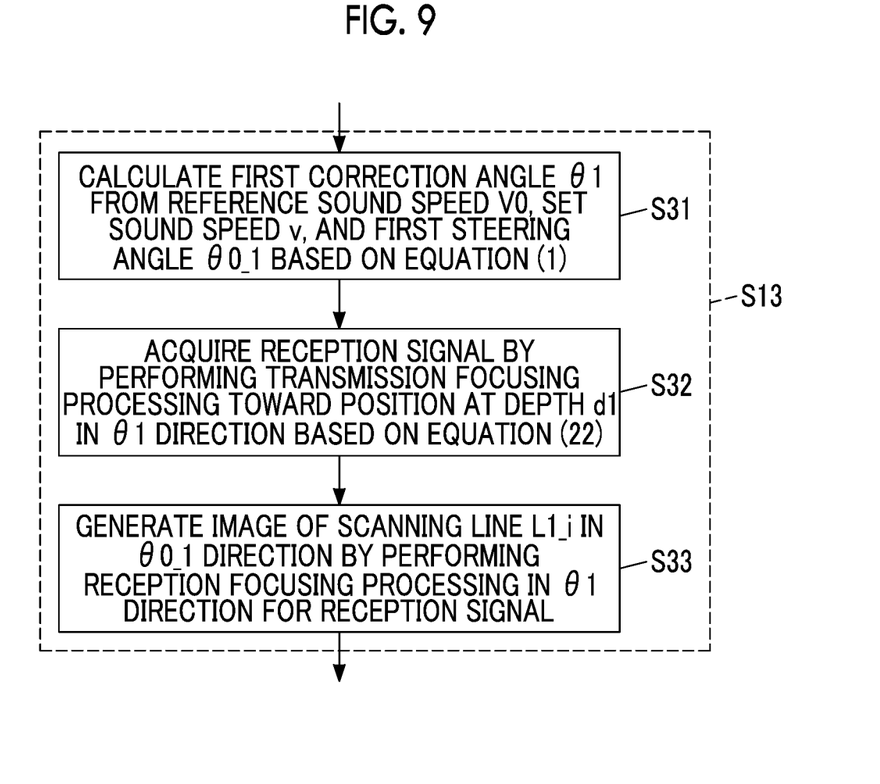
FIG. 9 is a partial flowchart showing the detailed flow of step S13 in FIG. 6.

Specifically, as shown in step S31 of FIG. 9, by substituting the reference sound speed V0, which is the value of the speed of sound in the subject, and the set sound speed v and the first direction (first steering angle) θ0_1, which are used in the transmission focusing processing and the reception focusing processing, into the above Equation (1), a first correction angle θ1 for correcting the transmission delay pattern used in the transmission focusing processing and the reception delay pattern used in the reception focusing processing is calculated.

Then, in step S32, a transmission beam is transmitted from the ultrasonic probe 1 by performing transmission focusing processing based on the first correction angle θ1, and the ultrasonic echo from the subject is received to acquire the reception signal. Then, as shown in step S33, the phasing addition section 13 of the image generation unit 4 acquires the reception data of the scanning line L1_1 in the first direction θ0_1 by performing reception focusing processing based on the first correction angle θ1. The reception data of the scanning line L1_1 in the first direction θ0_1 is subjected to envelope detection processing by the detection processing section 14, and is stored in the image memory 17 as a B-mode image signal of the scanning line L1_1 in the first direction θ0_1.

After the B-mode image signal of the scanning line L1_1 in the first direction θ0_1 is stored in the image memory 17, the process proceeds to step S14 to generate a B-mode image signal of a second steering image corresponding to the scanning line L2_1 in the second direction θ0_2 shown in FIG. 7C.

Figure 10:
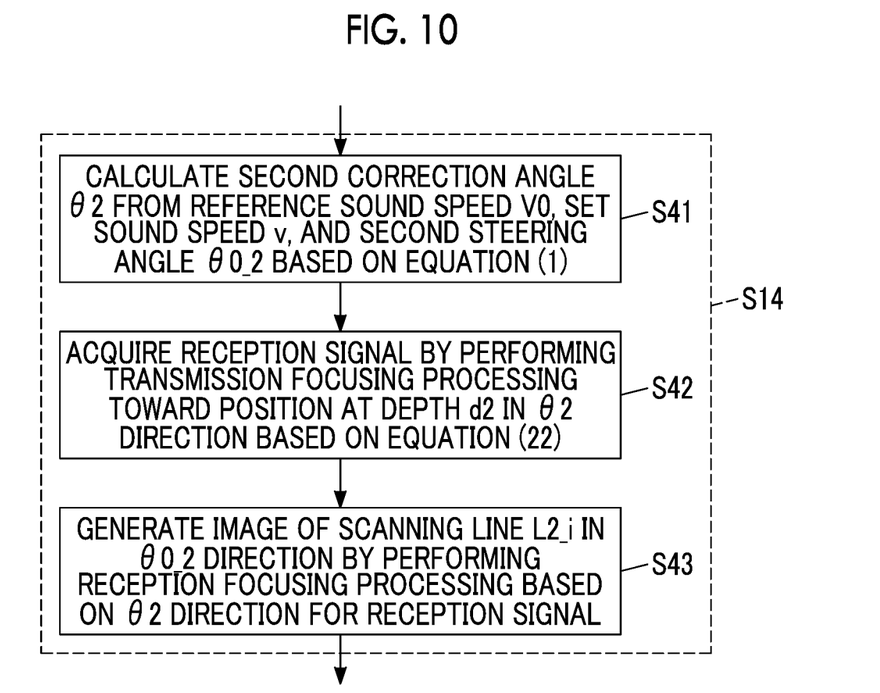
FIG. 10 is a partial flowchart showing the detailed flow of step S14 in FIG. 6.

Specifically, similar to the above case of the first direction θ0_1, as shown in step S41 of FIG. 10, by substituting the reference sound speed V0, which is the value of the speed of sound in the subject, and the set sound speed v and the second direction (second steering angle) θ0_2, which are used in the transmission focusing processing and the reception focusing processing, into the above Equation (1), a second correction angle θ2 for correcting the transmission delay pattern used in the transmission focusing processing and the reception delay pattern used in the reception focusing processing is calculated.

Then, in step S42, a transmission beam is transmitted from the ultrasonic probe 1 by performing transmission focusing processing based on the second correction angle θ2, and the ultrasonic echo from the subject is received to acquire the reception signal. Then, as shown in step S43, the phasing addition section 13 of the image generation unit 4 acquires the reception data of the scanning line L2_1 in the second direction θ0_2 by performing reception focusing processing based on the second correction angle θ2. The reception data of the scanning line L2_1 in the second direction θ0_2 is subjected to envelope detection processing by the detection processing section 14, and is stored in the image memory 17 as a B-mode image signal of the scanning line L2_1 in the second direction θ0_2.

After the B-mode image signals corresponding to the scanning lines L0_1, L1_1, and L2_1 in the normal direction, the first direction θ0_1, and the second direction θ0_2 are stored in the image memory 17 as described above, it is determined whether or not i=n in step S15. Since i=1, the process proceeds to step S16 to set i=2 by increasing i by 1, and steps S12 to S15 are repeated again.

By repeating steps S12 to S15 until i=n in this manner, B-mode image signals corresponding to all scanning lines in the normal direction, B-mode image signals corresponding to all scanning lines in the first direction θ0_1, and B-mode image signals corresponding to all scanning lines in the second direction θ0_2 are generated, and are stored in the image memory 17.

When i=n, that is, when the B-mode image signals corresponding to all scanning lines in the normal direction, the first direction, and the second direction are generated, the process proceeds to step S17. In step S17, the DSC 15 generates a piece of ultrasonic image data corresponding to the real space by scan-converting the B-mode image signals corresponding to all scanning lines stored in the image memory 17 for each direction. Here, normal image data in the normal direction, first steering image data in the first direction θ0_1, and second steering image data in the second direction θ0_2 are generated.

Here, it is assumed that the scanning line directions when scan-converting the B-mode image signals in the first and second directions are not the correction angles θ1 and θ2 but the steering angles θ0_1 and θ0_2 or steering angles that are set additionally. In addition, it is assumed that the sound speed is not the set sound speed v but the reference sound speed V0 or a sound speed that is set additionally.

After the normal image data, the first steering image data, and the second steering image data are generated, in subsequent step S18, the image processing section 16 generates a piece of composite image data by performing spatial compounding on these pieces of data in the three directions. In the same manner as described above, the composite image data is subjected to predetermined gradation processing or the like by the image processing section 16, and is displayed on the display unit 6 through the display control unit 5.

In the ultrasonic image generation method according to second embodiment, even if at least one of the set sound speed used in transmission focusing processing and the set sound speed used in reception focusing processing is changed, it is possible to accurately combine (spatial compounding) a plurality of ultrasonic images with different steering directions without shifting the position of the image.

In the first and second embodiments, when the set sound speed is changed, the correction steering angle used in the transmission focusing processing and the collection steering angle used in the reception focusing processing are re-calculated. However, only one of the correction steering angle used in the transmission focusing processing and the correction steering angle used in the reception focusing processing may be re-calculated.

For example, by performing reception focusing processing by re-calculating the correction steering angle by changing the set sound speed for the reception data stored in the reception signal memory 8, image generation is performed. Therefore, since it is possible to generate a plurality of ultrasonic images with different set sound speeds used in reception focusing processing, it is possible to observe an image quality change due to the set sound speed without changing the position on the image. In addition, even if only one of the correction steering angle used in the transmission focusing processing and the correction steering angle used in the reception focusing processing is re-calculated, directions of the transmission beam and the reception beam that are actually formed in the subject are not shifted. Therefore, there is no image quality degradation due to this.

By changing the set sound speed and checking the sharpness of the ultrasonic image based on the changed set sound speed as described above, it is possible to determine the true value of the sound speed V0 in the subject. That is, the set sound speed v at which the most sharp ultrasonic image is obtained can be determined to be the true value of the sound speed V0 in the subject. Since it is possible to form a transmission beam and a reception beam in the correct direction in the subject based on the true value of the sound speed V0 in the subject obtained as described above, it is possible to obtain a sector image with no distortion based on the correct scanning line direction or a high-quality composite image (spatial compound image) with no positional shift in each steering direction.

In step S2 of the first embodiment, the steering angle $\theta 0\_i$ of all scanning lines corresponding to the sector scan is calculated, and the correction steering angle $\theta i$ for all scanning lines is calculated. However, only for a specific scanning line, the steering angle $\theta 0\_i$ may be calculated, and the correction steering angle $\theta i$ may be calculated. For scanning lines other than the specific scanning line, the correction steering angle $\theta i$ corresponding to each scanning line may be calculated by performing an interpolation operation based on the correction steering angle $\theta i$ of the specific scanning line.

In the second embodiment, ultrasonic images obtained by performing transmission focusing processing and reception focusing processing in three directions including the normal direction are combined, but the present invention is not limited to the three directions. For example, ultrasonic images obtained by performing transmission focusing processing and reception focusing processing in five directions or seven directions may be combined.

In the first and second embodiments, a correction steering angle is calculated based on the above Equation (1), and the transmission focusing processing and the reception focusing processing are performed based on the correction steering angle. However, for example, a correction table, in which a distance from the predetermined position in the subject given by Equation (22) to each element forming the transmission and reception opening of the ultrasonic probe 1 is described in advance, or a correction table, in which a distance from the predetermined position in the subject given by Equation (22) to each element forming the transmission and reception opening of the ultrasonic probe 1 and an arrival time from the predetermined position in the subject calculated from the predetermined reference sound speed and the predetermined set sound speed to each element or a difference (delay time) from the arrival time in the center element of the transmission and reception opening is described in advance, may be provided, and the transmission focusing processing and the reception focusing processing may be corrected based on the above correction tables.

Specifically, first, a delay time from each location in a predetermined transmission or reception beam direction to each element in a predetermined reference sound speed is calculated. Alternatively, the delay time is acquired from the correction tables. Then, in the predetermined set sound speed, the trajectory of the location corresponding to a delay time closest to the delay time from each location to each element in the reference sound speed calculated or acquired as described above is calculated. This trajectory becomes a correction beam direction in the predetermined set sound speed corresponding to a predetermined transmission or reception beam direction in the predetermined reference sound speed. In addition, the correction beam direction is not a straight line in a shallow part in the subject. In the predetermined set sound speed, it is preferable to perform the transmission focusing processing or the reception focusing processing along the correction beam direction.

In the transmission focusing processing and the reception focusing processing based on Equation (1), error is relatively large in a shallow part in the subject due to the influence of approximation. However, by performing a calculation using the correction tables based on Equation (22) for the transmission focusing processing or the reception focusing processing in a shallow part in the subject, it is possible to calculate a transmission delay pattern and a reception delay pattern more accurately than Equation (1). Therefore, the directions of the transmission beam and the reception beam formed in a shallow part in the subject can be matched with each other more accurately regardless of the set sound speed.

While the ultrasonic diagnostic device and the ultrasonic image generation method of the present invention have been described in detail, the present invention is not limited to the embodiments described above, and various modifications or changes may be made without departing from the scope and spirit of the present invention.

EXPLANATION OF REFERENCES

1: ultrasonic probe
2: transmission circuit
3: reception circuit
4: image generation unit
5: image display unit
6: display unit
7: focusing processing connection unit
8: reception signal memory
9: control unit
10: set sound speed changing unit
11: operation unit
12: storage unit.

What is claimed is:

1. An ultrasonic diagnostic device that transmits an ultrasonic wave toward a subject from an ultrasonic probe and generates an ultrasonic image based on obtained reception data, comprising:

a memory configured to store a predetermined angle and a predetermined sound speed;

a transmission and reception unit configured to perform transmission focusing processing using calculated delays for forming a transmission beam based on ultrasonic waves transmitted from elements of a transmission and reception opening and reception focusing processing for forming a reception beam based on ultrasonic waves received by the elements of the transmission and reception opening in a steering direction from a normal direction of an ultrasonic wave transmitting and receiving surface of an element at a center of the transmission and reception opening of the ultrasonic probe;

a set sound speed setting unit configured to set a first sound speed received through user input, and used in the transmission focusing processing and the reception focusing processing, the first sound speed being different from the predetermined sound speed; and a focusing processing correction unit configured to calculate another angle based on (i) the first sound speed, (ii) the predetermined angle, and (iii) the predetermined sound speed, the another angle being different from the predetermined angle, and to calculate delays of the transmission focusing processing and the reception focusing processing based only on the another angle without using the predetermined angle.

2. The ultrasonic diagnostic device according to claim 1, wherein the focusing processing correction unit calculates the delays of the transmission focusing processing and the reception focusing processing based on the corrected angle of the steering direction calculated by the following Equation (A), $$\theta = \arcsin(\sin(\theta 0) \cdot v/V0) \quad (A)$$

($\theta$: corrected angle of steering direction, $\theta 0$: angle of steering direction, v: set sound speed, and V0: reference sound speed set additionally).

3. The ultrasonic diagnostic device according to claim 1, wherein the focusing processing correction unit further includes a correction table, and corrects the delays of the transmission focusing processing and the reception focusing processing based on the correction table.

4. The ultrasonic diagnostic device according to claim 3, wherein a distance from a predetermined position in the subject to each element of the ultrasonic probe is described in the correction table.

5. The ultrasonic diagnostic device according to claim 3, wherein a distance from a predetermined position in the subject to each element of the ultrasonic probe and an arrival time from the predetermined position, which is calculated from a set sound speed and a reference sound speed set additionally, to each element or a delay that is a difference between the arrival time and an arrival time in a specific element of the ultrasonic probe are described in the correction table.

6. The ultrasonic diagnostic device according to claim 1, further comprising:
an image generation unit,
wherein the image generation unit further includes an image memory that stores a plurality of ultrasonic images as image data and an image processing section that combines a plurality of the ultrasonic images based on the image data stored in the image memory, and
the image processing section generates a composite ultrasonic image by combining a plurality of ultrasonic images having the different steering directions.

7. An ultrasonic image generation method of transmitting an ultrasonic wave toward a subject from an ultrasonic probe and generating an ultrasonic image based on obtained reception data, comprising:
storing a predetermined angle and a predetermined sound speed in a memory;
performing transmission focusing processing using calculated delays for forming a transmission beam based on ultrasonic waves transmitted from elements of a transmission and reception opening and reception focusing processing for forming a reception beam based on ultrasonic waves received by the elements of the transmission and reception opening in a steering direction from a normal direction of an ultrasonic wave transmitting and receiving surface of an element at a center of the transmission and reception opening of the ultrasonic probe;
setting a first sound speed received through user input, and used in the transmission focusing processing and the reception focusing processing, the first sound speed being different from the predetermined sound speed; and
calculating another angle based on (i) the first sound speed, (ii) the predetermined angle, and (iii) the predetermined sound speed, the another angle being different from the predetermined angle, and calculating delays of the transmission focusing processing and the reception focusing processing based only on the another angle without using the predetermined angle.

8. The ultrasonic diagnostic device according to claim 1, wherein the transmission and reception unit performs the transmission focusing processing and the reception focusing processing toward a focus that is located at a predetermined depth in the steering direction from a center of a transmission and reception opening of the ultrasonic probe.

9. The ultrasonic image generation method according to claim 7, wherein the transmission focusing processing and the reception focusing processing are performed toward a focus that is located at a predetermined depth in the steering direction from a center of a transmission and reception opening of the ultrasonic probe.

10. An ultrasonic diagnostic device that transmits an ultrasonic wave toward a subject from an ultrasonic probe and generates an ultrasonic image based on obtained reception data, comprising:
a memory configured to store a predetermined angle and a predetermined sound speed;
a transmission and reception unit configured to perform transmission focusing processing using calculated delays for forming a transmission beam based on ultrasonic waves transmitted from elements of a transmission and reception opening in a steering direction from a normal direction of an ultrasonic wave transmitting and receiving surface of an element at a center of the transmission and reception opening of the ultrasonic probe;
a set sound speed setting unit configured to set a first sound speed received through user input, and used in the transmission focusing processing, the first sound speed being different from the predetermined sound speed; and
a focusing processing correction unit configured to calculate another angle based on (i) the first sound speed, (ii) the predetermined angle, and (iii) the predetermined sound speed, the another angle being different from the predetermined angle, and to calculate a delay of the transmission focusing processing based only on the another angle without using the predetermined angle.

11. An ultrasonic diagnostic device that transmits an ultrasonic wave toward a subject from an ultrasonic probe and generates an ultrasonic image based on obtained reception data, comprising:
a memory configured to store a predetermined angle and a predetermined sound speed;
a transmission and reception unit configured to perform reception focusing processing using calculated delays for forming a reception beam based on ultrasonic waves received by elements of a transmission and reception opening in a steering direction from a normal direction of an ultrasonic wave transmitting and receiving surface of an element at a center of the transmission and reception opening of the ultrasonic probe;
a set sound speed setting unit configured to set a first sound speed received through user input, and used in the reception focusing processing, the first sound speed being different from the predetermined sound speed; and
a focusing processing correction unit, configured to calculate another angle based on (i) the first sound speed, (ii) the predetermined angle, and (iii) the predetermined sound speed, the another angle being different from the predetermined angle, and to calculate a delay of the reception focusing processing based only on the another angle without using the predetermined angle.

12. An ultrasonic image generation method of transmitting an ultrasonic wave toward a subject from an ultrasonic probe and generating an ultrasonic image based on obtained reception data, comprising:

storing a predetermined angle and a predetermined sound speed in a memory;

performing transmission focusing processing for forming a transmission beam based on ultrasonic waves transmitted from elements of a transmission and reception opening in a steering direction from a normal direction of an ultrasonic wave transmitting and receiving surface of an element at a center of the transmission and reception opening of the ultrasonic probe;

setting a first sound speed received through user input, and used in the transmission focusing processing, the first sound speed being different from the predetermined sound speed; and calculating another angle based on (i) the first sound speed, (ii) the predetermined angle, and (iii) the predetermined sound speed, the another angle being different from the predetermined angle, and calculating a delay of the transmission focusing processing based only on the another angle without using the predetermined angle.

13. An ultrasonic image generation method of transmitting an ultrasonic wave toward a subject from an ultrasonic probe and generating an ultrasonic image based on obtained reception data, comprising:

storing a predetermined angle and a predetermined sound speed in a memory;

performing reception focusing processing for forming a reception beam based on ultrasonic waves received by elements of a transmission and reception opening in a steering direction from a normal direction of an ultrasonic wave transmitting and receiving surface of an element at a center of the transmission and reception opening of the ultrasonic probe;

setting a first sound speed received through user input, and used in the reception focusing processing, the first sound speed being different from the predetermined sound speed; and calculating another angle based on (i) the first sound speed, (ii) the predetermined angle, and (iii) the predetermined sound speed, the another angle being different from the predetermined angle, and calculating a delay of the reception focusing processing based only on the another angle without using the predetermined angle.

* * * * *